US009200663B2

(12) United States Patent  (10) Patent No.: US 9,200,663 B2
Ryan  (45) Date of Patent: Dec. 1, 2015

(54) PROJECTED BOLT IMPACT PROTECTION DEVICE

(75) Inventor: Mark William Ryan, Murphy, TX (US)

(73) Assignee: Pride Construction Products, LLC, Libertyville, IL (US)

( * ) Notice: Subject to any disclaimer, the term of this patent is extended or adjusted under 35 U.S.C. 154(b) by 191 days.

(21) Appl. No.: 13/594,550

(22) Filed: Aug. 24, 2012

(65) Prior Publication Data

US 2013/0051953 A1     Feb. 28, 2013

Related U.S. Application Data

(60) Provisional application No. 61/528,081, filed on Aug. 26, 2011.

(51) Int. Cl.
| | |
|---|---|
| *F16B 37/14* | (2006.01) |
| *E04B 1/41* | (2006.01) |
| *E04G 21/32* | (2006.01) |
| *F16B 5/06* | (2006.01) |
| *F16B 5/12* | (2006.01) |

(52) U.S. Cl.
CPC ............... *F16B 37/14* (2013.01); *E04B 1/4157* (2013.01); *E04G 21/3252* (2013.01); *F16B 5/065* (2013.01); *F16B 5/126* (2013.01); *F16B 5/128* (2013.01)

(58) Field of Classification Search
CPC .......... F16B 5/065; F16B 5/126; F16B 37/04; A10B 12/006
USPC ................... 411/372.6, 372.5, 101, 133, 966; 301/37.101
IPC ....................................................... F16B 37/04
See application file for complete search history.

(56) References Cited

U.S. PATENT DOCUMENTS

| 1,985,908 | A | * | 1/1935 | Zerk ........................... 301/37.38 |
| 2,067,008 | A | * | 1/1937 | Fergueson .................... 152/415 |
| 3,854,371 | A | | 12/1974 | Lamothe |
| 3,969,786 | A | * | 7/1976 | Peak .............................. 16/86 A |
| 4,617,771 | A | * | 10/1986 | Tomaszewski ................. 52/410 |
| 4,732,517 | A | * | 3/1988 | Crouch et al. .................. 411/39 |

(Continued)

FOREIGN PATENT DOCUMENTS

WO    WO 2009/093805     7/2009

OTHER PUBLICATIONS

Abstract JP2001063752 A, Obtained from European Patent Office on Nov. 11, 2014, 1 page.

*Primary Examiner* — Gary Estremsky
(74) *Attorney, Agent, or Firm* — Klemchuk LLP; Kirby B. Drake

(57) ABSTRACT

A projected bolt impact protection device configured to protect a projected bolt may comprise a cap having a substantially hollow vertical shaft with a first section configured to accommodate a portion of the projected bolt. Another impact protection device configured to protect one or more projected bolts may comprise a cap having a plurality of substantially hollow vertical shafts, each shaft configured to accommodate at least a portion of each projected bolt. Yet another impact protection device may comprise a cap having a substantially hollow vertical shaft, the shaft configured to accommodate the one or more projected bolts; a disk member configured to fit within the shaft having one or more vertical ports; and support means for supporting the disk horizontally within the shaft at an axial depth configured to provide for a portion of the projected bolts to extend through and protrude from the one or more disk ports.

20 Claims, 10 Drawing Sheets

(56) References Cited

U.S. PATENT DOCUMENTS

| | | | |
|---|---|---|---|
| 5,988,966 A * | 11/1999 | Chen et al. | 411/372 |
| 6,012,889 A * | 1/2000 | Robbins et al. | 411/372.6 |
| 6,135,691 A | 10/2000 | Nadarajah | |
| 6,296,429 B1 * | 10/2001 | Wright | 411/5 |
| 6,347,916 B1 | 2/2002 | Ramirez | |
| 7,174,689 B2 | 2/2007 | Alyea | |
| 7,596,917 B2 | 10/2009 | Schloemer et al. | |
| 7,658,580 B1 * | 2/2010 | Conway et al. | 411/374 |
| 7,762,027 B1 * | 7/2010 | Wentworth et al. | 52/173.3 |
| 7,905,064 B1 * | 3/2011 | Wentworth et al. | 52/173.3 |
| 8,051,690 B2 * | 11/2011 | Camisasca | 70/232 |
| 8,057,146 B2 * | 11/2011 | Zeytoonian | 411/372.5 |
| 8,282,327 B2 * | 10/2012 | Miyagawa et al. | 411/372.6 |
| 2002/0175559 A1 * | 11/2002 | Inoue et al. | 301/37.101 |
| 2010/0080667 A1 | 4/2010 | Reed | |
| 2011/0027044 A1 * | 2/2011 | Dillenberger | 411/372.5 |

\* cited by examiner

PROJECTED BOLT IMPACT PROTECTION DEVICE

CROSS-REFERENCE TO RELATED APPLICATIONS

This application claims priority to U.S. Provisional Patent Application No. 61/528,081, entitled PROJECTED BOLT IMPACT PROTECTION DEVICE, filed Aug. 26, 2011, which is hereby incorporated by reference for all purposes.

FIELD OF THE DISCLOSURE

The present disclosure generally relates to a device for protecting bolts projecting from a base material (e.g. concrete) or other connecting material (e.g. steel plate), and more particularly, to a device configured to decrease the likelihood of damage to protruding bolts caused by impacts from construction equipment, heavy machinery or other causes.

BACKGROUND

Anchor bolts (cast-in or post-installed) are commonly used in residential and commercial construction, as well as industry, for the purpose of anchoring columns, sill plates, post bases, hold-downs, machinery and other structural or industrial components to concrete foundations and slabs, or other base materials such as rock or metal fabrications. Anchor bolts typically must be designed with sufficient embedment into the base material to resist applied combinations of shear and uplift forces.

Anchor bolts projecting from concrete typically have a length above the surface that is dependent on the type of element that will be attached to the bolts as well as other engineering, detailing and construction considerations. Because of the projection, it is a frequent occurrence for bolts to be damaged, bent over or broken off during construction activities by heavy equipment that is being used around the bolts prior to the placement of the column or other element to be attached. This damage to the anchor bolt can cause increased construction costs, construction delays, and other adverse consequences. Moreover, a protruding bolt may present a safety hazard on a construction site.

There are a number of methods that have been developed in the field to attempt to protect projected bolts from impacts and damage during construction and to reduce safety hazards, such as drilling holes in wood blocking and securing it with nuts and washers. However, those methods provide little, if any, protection against damage by heavy equipment, and are rarely employed due to the time and effort involved in their implementation. While certain anchor bolt cap products and designs are currently known, the known designs only protect projected bolts from corrosion and degradation that could compromise the fastener's structural integrity or make it difficult to either attach the nuts to the bolt or unscrew them at a later time. Corrosion is rarely an issue with column and sill plate anchor bolts, as they are typically not exposed for a long enough time for sufficient corrosion to affect either fastener integrity or to prevent fastening of the nut. Likewise, for anchor bolts used in building construction, the unfastening of connections at a later time is usually not required or desired.

SUMMARY

Embodiments of the present disclosure generally provide a projected bolt impact protection device. In various embodiments, projected bolt impact protection device may be configured to protect bolts protruding from a surface from damage caused by impacts from construction equipment, heavy machinery or other causes.

The present disclosure is directed to a projected bolt impact protection device configured to protect a bolt projecting from a base surface, the projected bolt impact protection device may comprise a cap having a substantially hollow shaft extending through at least a portion thereof, the shaft being substantially vertically oriented within the cap; wherein the shaft may comprise a first section having dimensions configured to accommodate a portion of the bolt projecting from the base surface.

In an embodiment, the cap may be substantially dome-shaped. In another embodiment, all or a portion of the cap may have a gripping surface.

In various embodiments, the shaft may be in substantial coaxial alignment with a central vertical axis of the cap. In an embodiment, the first section may have a circular cross section. In another embodiment, all or a portion of the first section may have internal threading.

In various embodiments, the shaft may have a second section connected to and in substantial axial alignment with the first section. In an embodiment, the second section may have a larger radial dimension than that of the first section. In another embodiment, an inner diameter of the second section may be greater than a diameter of a bolt fastener. In yet another embodiment, an inner surface of the second section has a similar size and shape as a bolt fastener.

In an embodiment, the second section may be configured to accept a bolt fastener tool for tightening a bolt fastener to a portion of the bolt therein. In various embodiments, dimensions of the second section are configured to prevent a bolt fastener from rotating therein. In an embodiment, the second section has a hexagonal inner cross section. In another embodiment, the second section has a square inner cross section. In an embodiment, the shaft may have a third section configured to house one or more washers.

In various embodiments, projected bolt impact protection device may have a cleat for gripping the base surface. In various embodiments, projected bolt impact protection device may have a gasket for creating a seal between the cap and the base surface.

In various embodiments, projected bolt impact protection device may have a plug. In an embodiment, a portion of the plug may be configured to couple with a section of the shaft. In another embodiment, the plug may be configured to couple with the cap. In yet another embodiment, the plug may have a rounded top. In still another embodiment, impact protection device may have a gasket for creating a seal between the plug and the cap.

In another aspect, the present disclosure is directed to a projected bolt impact protection device configured to protect one or more bolts projecting from a base surface, the projected bolt impact protection device may comprise a cap having a plurality of substantially hollow shafts extending through at least a portion thereof; wherein each shaft may be substantially vertically oriented within the cap; and wherein each shaft may have dimensions configured to accommodate at least a portion of each of the one or more bolts projecting from the base surface. In an embodiment, the plurality of shafts may fully extend through the cap.

In various embodiments, the cap may have one or more voids configured to accommodate portions of the one or more bolts extending therein from the plurality of shafts. In an embodiment, the one or more voids may be configured to accommodate bolt fastening hardware as secured on the portions of the one or more bolts extending therein from the plurality of shafts.

In various embodiments, the cap may have a lower section having an axial depth smaller than the one or more bolts projecting from the base surface and a substantially hollow upper section configured to accommodate portions of the one or more bolts extending therein from the lower section. In various embodiments, 28, the plurality of shafts may be of a shape and arranged in a pattern configured to accept varied bolt patterns. In an embodiment, at least one of the shafts may comprise a substantially elongated slot.

In an embodiment, projected bolt impact protection device may have a plug configured to couple with the cap. In another embodiment, the plug may couple with cap via a tab-and-slot mechanism. In yet another embodiment, projected bolt impact protection device may have one or more plugs configured to couple with a section of a shaft.

In another aspect, the present disclosure is directed to a projected bolt impact protection device configured to protect one or more bolts projecting from a base surface, the projected bolt impact protection device may comprise a cap having a substantially hollow shaft extending vertically therethrough, the shaft configured to accommodate the one or more bolts projecting from the base surface; a disk member configured to fit within the shaft, the disk member comprising one or more vertical ports; and support means for supporting the disk horizontally within the shaft at an axial depth configured to provide for a portion of the one or more bolts to extend through and protrude from the one or more disk ports.

In an embodiment, the support means may comprise a ledge formed at the juncture of an upper section of the shaft and a lower section of the shaft, the upper section having a larger radial dimension than the lower section. In another embodiment, the support means may comprise a ledge formed at the juncture of an upper section of the shaft and a lower section of the shaft, the upper section having a different shape than the lower section. In various embodiments, the support means may comprise one or more support members protruding into shaft.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure generally provide a projected bolt impact protection device. In various embodiments, projected bolt impact protection device may be configured to protect bolts protruding from a surface from damage caused by impacts from construction equipment, heavy machinery or other causes. In various embodiments, projected bolt impact protection device may generally comprise one or more vertical shafts configured to accept all or a portion of the protruding bolt, and a cap configured to resist and/or distribute shear forces and/or moments that may damage the bolt.

FIGS. 1-8B illustrate representative embodiments of projected bolt impact protection devices 100, 600, 700, 800 and parts thereof. It should be understood that the components of projected bolt impact protection devices 100, 600, 700, 800 and parts thereof shown in FIGS. 1-8B are for illustrative purposes only, and that any other suitable components or subcomponents may be used in conjunction with or in lieu of the components comprising projected bolt impact protection devices 100, 600, 700, 800 and the parts of projected bolt impact protection device 100, 600, 700, 800 described herein.

Figure 1:
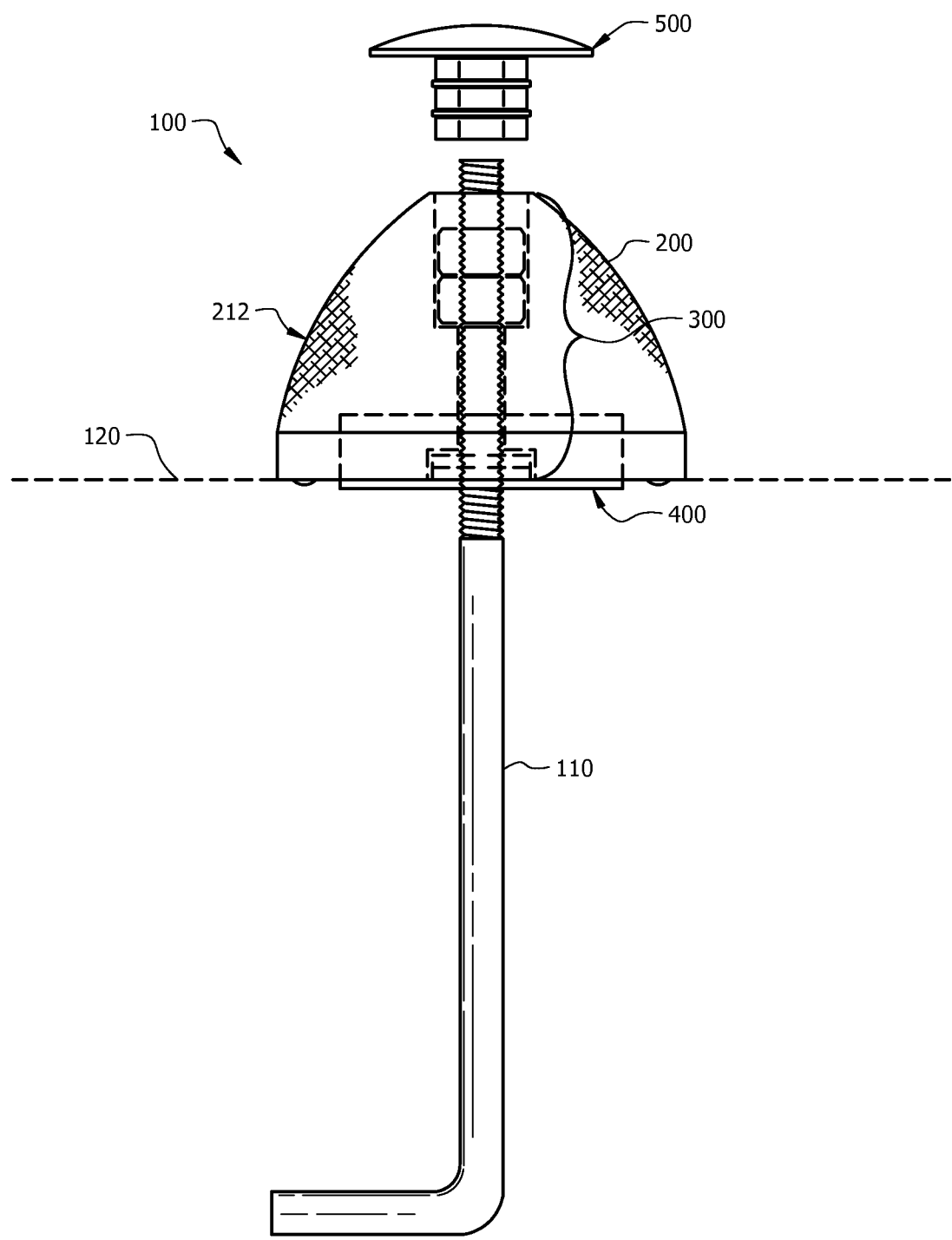
FIG. 1 depicts a side view of a projected bolt impact protection device 100 according to an embodiment of the present disclosure.

Referring to FIG. 1, a projected bolt impact protection device 100 may generally comprise a cap 200, a vertical shaft 300, a cleat 400, and a plug 500. Cap 200 may comprise any suitable shape and construction for enclosing and protecting all or a portion of a bolt 110 protruding from a base surface 120. In various embodiments, cap 200 may be constructed of any suitable heavy-duty, high-strength material including, but not limited to, high-density polyethylene, ceramic, fiber-reinforced plastic, metal, alloy, and synthetic rubber. In various embodiments, cap 200 may comprise a dome, cone, pyramidal, or n-sided polyhedron shape. It should be recognized that cap 200 may comprise any suitable shape and construction, and should not be limited only to the particular embodiments disclosed herein. In various embodiments, an outer surface of cap 200 may comprise a gripping surface 212 to facilitate overall grip and for facilitating the tightening of protection device 100 onto bolt 110. In an embodiment, gripping surface 212 may comprise a textured surface, such as raised or depressed lines arranged in a pattern (e.g. diagonal, criss-crossing or diamond plate), raised bumps of various shapes and/or patterns, or depressed dimples of various shapes and/or patterns. In various embodiments, gripping surface 212 may comprise an inlaid raised material, such as rubber or silicone. In an embodiment, inlaid raised gripping surface 212 may be configured in a continuous band around a circumference of cap 200. In another embodiment, gripping surface 212 may comprise inlaid raised material pieces configured in a pattern around outer surface of cap 200. In yet another embodiment, gripping surface 212 may cover only a portion of exterior of cap 200.

Figure 2:
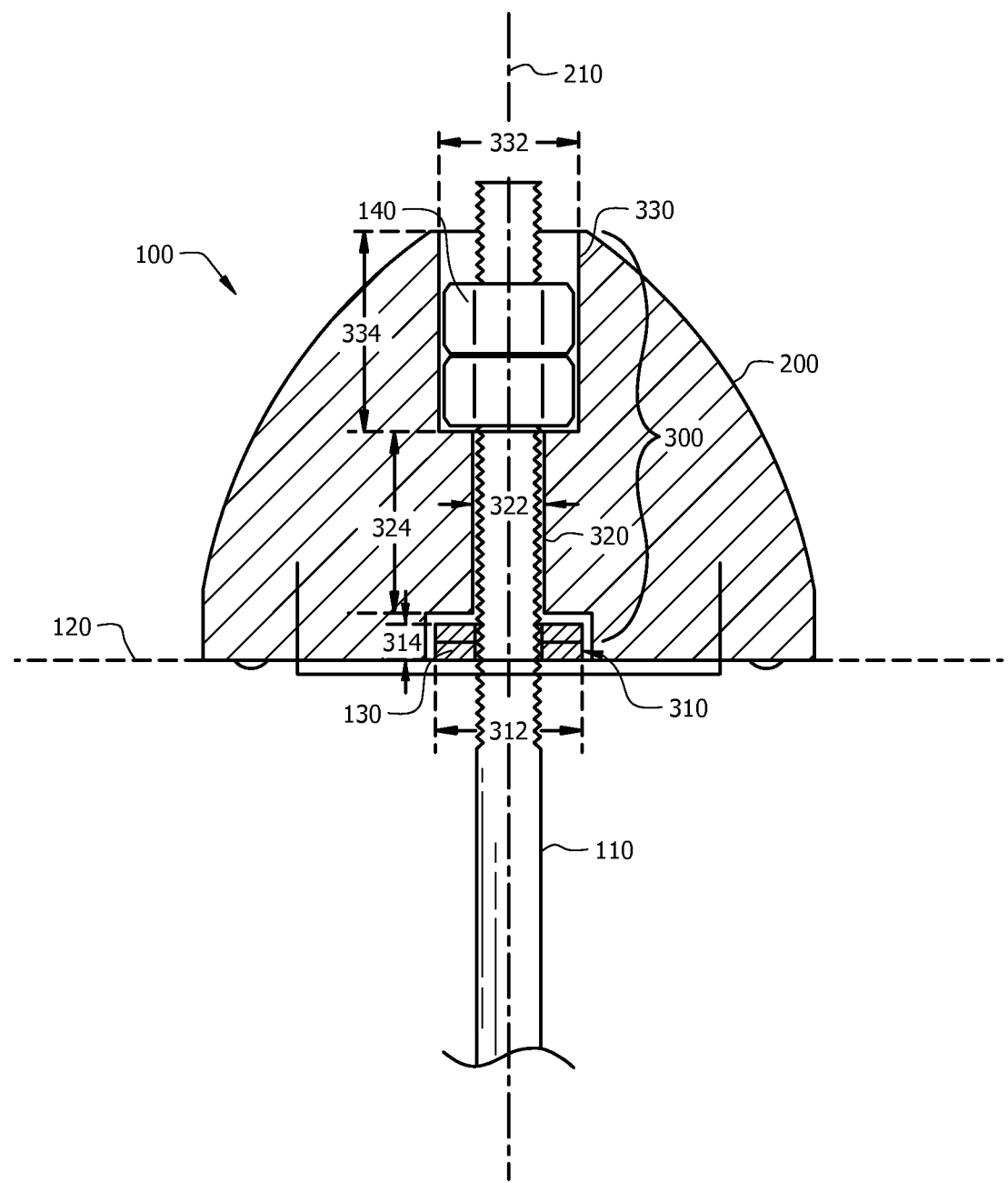
FIG. 2 depicts a cut-away side view of a projected bolt impact protection device 100 according to an embodiment of the present disclosure.
Figure 3A:
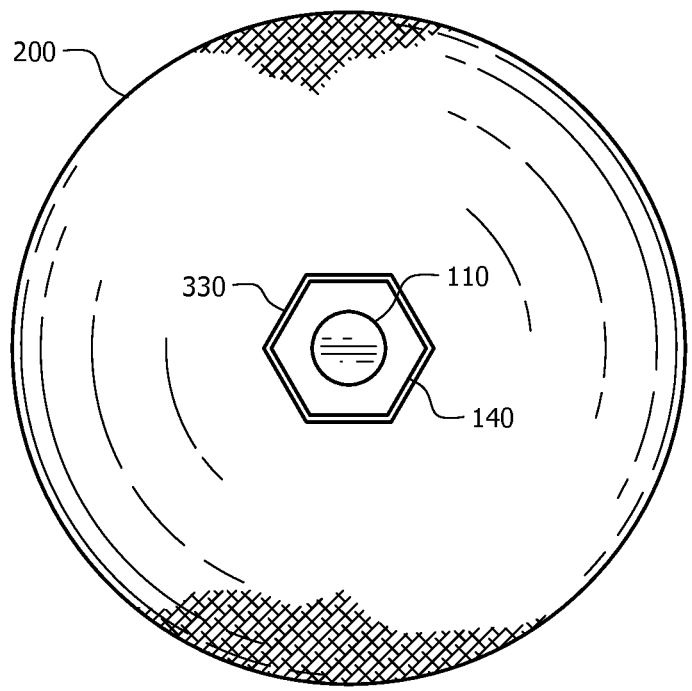
FIG. 3A depicts a top view of a projected bolt impact protection device 100 configured to couple the movement of a fastener with that of the device according to an embodiment of the present disclosure.
Figure 3B:
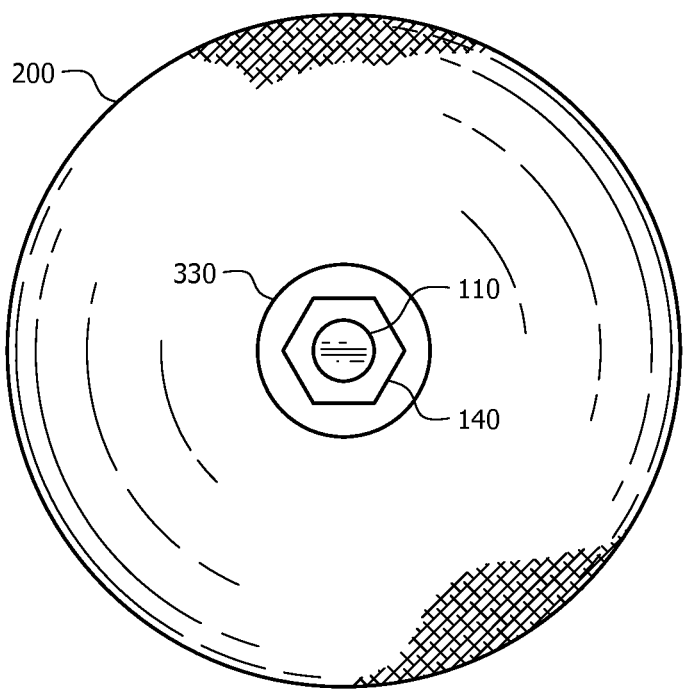
FIG. 3B depicts a top view of another projected bolt impact protection device 100 configured to provide for the use of a fastener tool on a bolt fastener therein according to an embodiment of the present disclosure.

Referring now to FIG. 2, projected bolt impact protection device 100 may further comprise a shaft 300. In an embodiment, shaft 300 may be extruded from, molded into, or otherwise integrated with cap 200. In another embodiment, shaft 300 may comprise one or more separate components that are coupled with cap 200. In various embodiments, shaft 300 may be substantially coaxial with a center axis 210 of cap 200. Shaft 300 may comprise any suitable shape for housing all or a portion of bolt 110 protruding from base surface 120. In various embodiments, shaft 300 may comprise one or more substantially hollow sections having inner dimensions suitable to accommodate portions of bolt 110 passing there through. In an embodiment, shaft 300 may comprise a lower section 310, a middle section 320, and an upper section 330. Lower section 310 may comprise any suitable shape and dimensions for accommodating one or more washers 130 therein. In an embodiment, lower section 310 may comprise a substantially circular or polygonal cross-section of sufficient inner diameter 312. In another embodiment, lower section 310 may be of sufficient axial depth 314 (height) to accommodate multiple washers 130 stacked axially therein. Middle section 320 may comprise any suitable shape and dimensions for accommodating portions of bolt 110 passing there through. In an embodiment, middle section 320 may comprise a shaft having a substantially circular or polygonal cross-section of sufficient inner diameter 322. In another embodiment, middle section 320 may comprise internal threading configured to couple with the exterior threading of a bolt 110. Upper section 330 may comprise any suitable shape and dimensions for accommodating all or a portion of fasteners 140 such as nuts or bolt heads disposed therein. In various embodiments, upper section 330 may comprise a substantially circular or polygonal cross-section of inner diameter 332 greater than inner diameter 322. In another embodiment, upper section 330 may be of sufficient axial depth 334 to accommodate two or more fasteners stacked axially therein. Referring now to FIG. 3A, in an embodiment, all or a portion of upper section 330 may have inner shape and dimensions similar to fastener(s) 140. Such an arrangement may prevent rotation of fastener 140 within upper section 330, thereby allowing fastener 140 to be screwed onto bolt 110 by rotating the cap-and-fastener assembly. In an embodiment, upper section 330 may be hexagonally-shaped to fit hexagonally-shaped fasteners 140. In another embodiment, upper section 330 may be square-shaped to fit square-shaped fasteners 140. In yet another embodiment, upper section 330 may be shaped to fit other standard- or custom-shaped fasteners 140. Referring now to FIG. 3B, in another embodiment, upper section 330 may comprise an inner diameter 332 that is significantly larger than the outer diameter of fastener 140. Such an arrangement may provide for the head of a tool (such as a socket wrench) to couple with and secure fastener 140 to bolt 110 within upper section 330.

Figure 4:
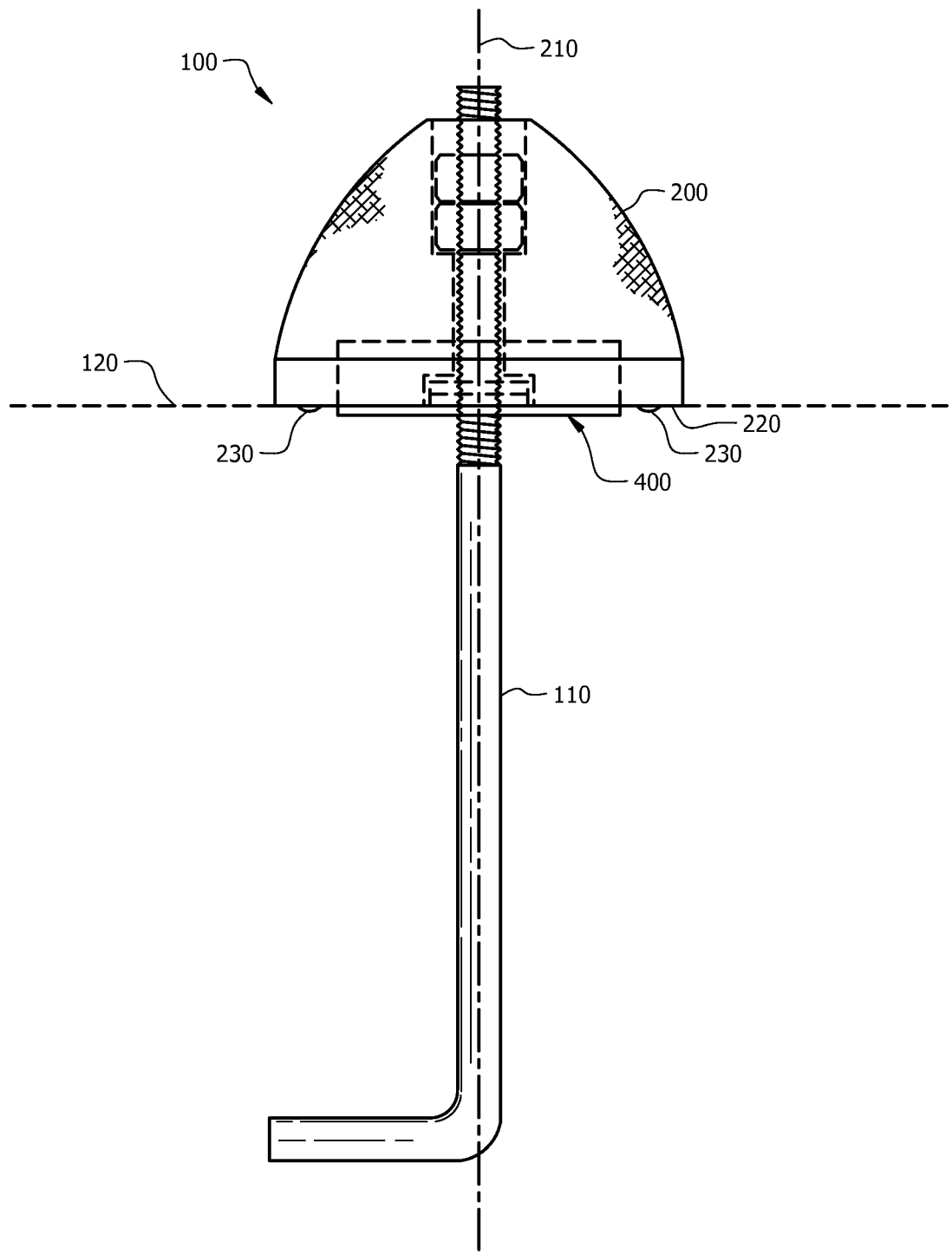
FIG. 4 depicts a side view of a projected bolt impact protection device 100 having a cleat and a gasket according to an embodiment of the present disclosure.

Referring now to FIG. 4, projected bolt impact protection device 100 may further comprise one or more cleats 400. Cleat 400 may be constructed of a high-strength and durable material (such as stainless steel or ceramic composite). Cleat 400 may be coupled with cap 200 such that a portion of cleat 400 projects a short distance below bottom 220 of cap 200. In an embodiment, cleat 400 may comprise one or more thin rings oriented concentric with center axis 210 of cap 200. In another embodiment, device 100 may comprise one or more cleats 400, each comprising a spike or a short linear/curved element, arranged in a pattern and configured to protrude a short distance below bottom 220 of cap 200. In another embodiment, cleat 400 may comprise a roughened or textured surface disposed on all or a portion of bottom 220 of cap 200. In various embodiments, cleats 400 may have beveled, sharpened or serrated edges to facilitate cutting into or gripping the base surface 120. In an embodiment, device 100 may further comprise a gasket ring 230 (possibly comprised of rubber, silicone or other flexible material) or similar mechanism that projects from bottom 220 of cap 200. Gasket ring 230 may be configured to improve the seal between bottom 220 of cap 200 and base surface 120, thereby minimizing the amount of surface moisture that contacts projected bolt 110.

Figure 5A:
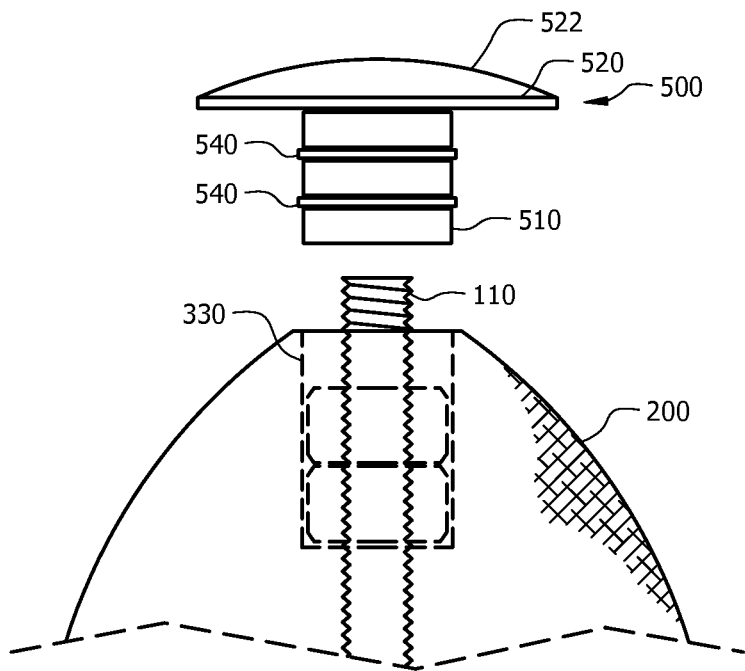
FIG. 5A depicts a side view of a projected bolt impact protection device 100 having a plug configured to couple with the shaft according to an embodiment of the present disclosure.
Figure 5B:
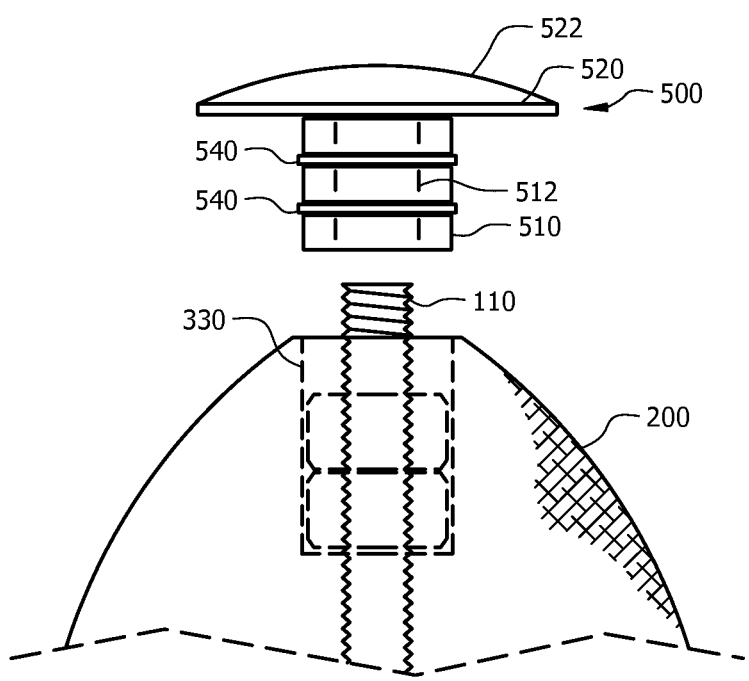
FIG. 5B depicts a side view of a projected bolt impact protection device 100 having a plug configured to couple with the bolt according to an embodiment of the present disclosure.

Referring now to FIGS. 5A and 5B, projected bolt impact protection device 100 may further comprise a plug 500. Plug 500 may comprise any suitable material and construction suitable to decrease or prevent the collection of moisture around bolt 110 and within vertical shaft 300. In various embodiments, plug 500 may comprise a lower section 510 and upper section 520. Referring now to FIG. 5A, in an embodiment, lower section 510 of plug 500 may comprise the same or similar shape as upper section 330 of shaft. In another embodiment, lower section 510 may be substantially hollow. Such configurations may provide for plug 500 to be inserted into upper section 330 of vertical shaft 300. Upper section 520 may comprise a top surface 522 to enclose the end of plug 500. In an embodiment, top surface 522 may have a flat or convex shape, which may help reduce the likelihood of injuries from falling or stepping on the protruding bolt 110. Referring now to FIG. 5B, in various embodiments, plug 500 may be configured to couple with bolt 110 in addition to or in the alternative of coupling with upper section 330 of vertical shaft 300. In an embodiment, all or a portion of lower section 510 may comprise a shaft 512 having internal threading configured to couple with external threading on bolt 110. In another embodiment, shaft 512 of lower section 510 may be of dimensions suitable to couple with bolt 110 through friction fit or mechanical means. In various embodiments, exterior of plug 500 may comprise a gripping surface (not shown) similar to that previously described for cap 200. In an embodiment, plug 500 may further comprise one or more gasket rings 540 or similar mechanism. In an embodiment, gasket ring 540 may be disposed around lower section 510, thereby sealing the connection between plug 500 and the upper section 330 of shaft 300. In an embodiment, friction between gasket ring 540 and the inside surface of upper section 330 of cap shaft 300 may provide means for securing plug 500 over bolt 110.

Figure 6A:
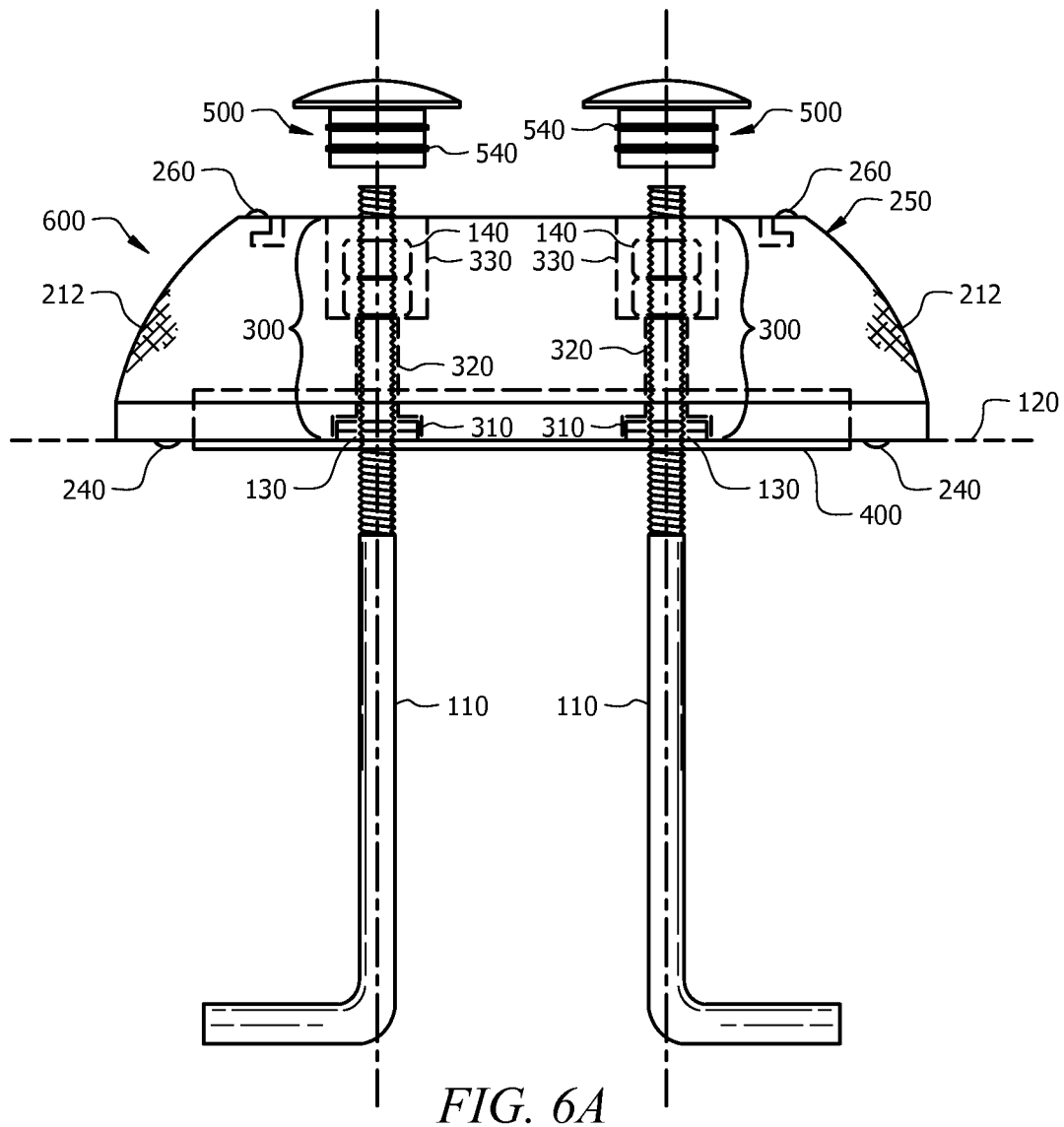
FIG. 6A depicts a side view of a projected bolt impact protection device 600 according to an embodiment of the present disclosure.
Figure 6B:
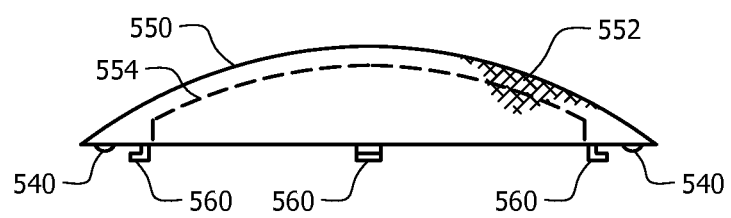
FIG. 6B depicts a top view of a projected bolt impact protection device 600 according to an embodiment of the present disclosure.
Figure 6C:
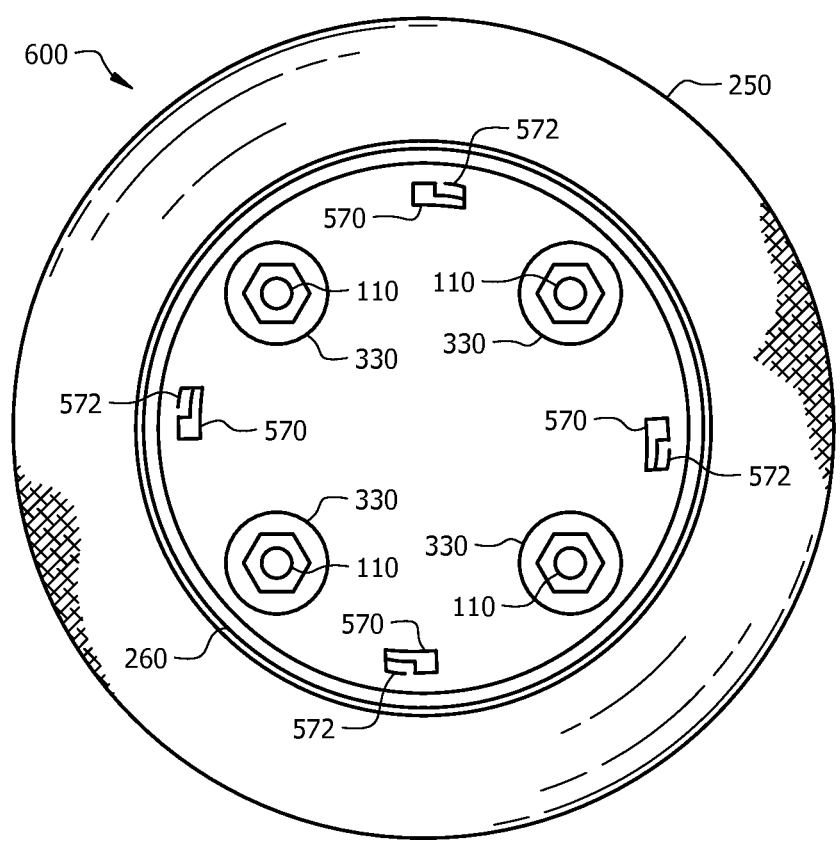
FIG. 6C depicts a side view of a plug configured to couple with a cap of projected bolt impact protection device 600 via a tab-and-slot coupling mechanism projected bolt impact protection device 600 according to an embodiment of the present disclosure.

Referring now to FIGS. 6A, 6B, and 6C, another projected bolt impact protection device 600 is depicted. Device 600 may comprise a cap 250 and multiple vertical shafts 300 similar to previously described embodiments. In various embodiments, vertical shafts 300 may be arranged in any suitable pattern—in some embodiments, shafts 300 may be arranged in a pattern known to fit a grouping of multiple bolts 110. In various embodiments, middle section 320 of each shaft 300 may comprise any shape and construction suitable to accept one of a group of bolts 110; stated otherwise, middle sections 320 may be configured in a manner suitable for the device 600 to be positioned over a grouping of bolts 110 and subsequently slid down the bolts 110 until it rests on base surface 120. In various embodiments, middle sections 320 may comprise circular or polygonal cross sections, and may be slotted (straight or curved), threaded, or unthreaded. Lower section 310 of each shaft 300 may comprise any suitable shape and construction as previously described, and in various embodiments, may be circular, polygonal, or slotted (straight or curved). In an embodiment, lower section 310 may comprise inner diameter 312 and axial depth 314 suitable to accommodate one or more washers 130 therein. Upper sections 330 of shafts 300 may comprise any suitable shape and construction as previously described, and in various embodiments, may be circular, polygonal or slotted (straight or curved). In an embodiment, upper section 330 may be shaped and sized such that fasteners 140 may be tightened about each bolt 110 with a socket wrench (or other suitable tool), thereby securing device 600 to bolts 110 protruding from base surface 120 as previously described. Referring to FIG. 6A, in various embodiments, device 600 may comprise one or more plugs 500, and in an embodiment, comprises an equal number of plugs 500 as shafts 300. Referring to FIG. 6B, in various embodiments, device 600 may comprise a plug 550 having any suitable shape and construction such that it may be coupled to the top of the cap 250. In various embodiments, plug 550 may be dome-, cone-, pyramidal-, or n-sided polyhedron-shaped with a hollow interior 554. In an embodiment, plug 550 may be snapped in place or otherwise couple with cap 250 by any suitable mechanical means. Referring to FIGS. 6B and 6C, in another embodiment, cap 250 may comprise one or more tabs 560 configured to insert into slots 570 on plug 550, or vice versa. Slots 570 may comprise a narrow portion 572 in some embodiments, thereby providing for plug 550 to lock into narrow portion 572 when rotated. In various embodiments, plug 550 and/or cap 250 may comprise one or more gasket rings 540, 260, respectively, for sealing the plug-cap interface. In various embodiments, plug 550 and/or cap 250 may comprise a gripping surface 552, 212, respectively, as previously described. In various embodiments, cap 250 may comprise one or more cleats 400 as previously described.

Figure 7A:
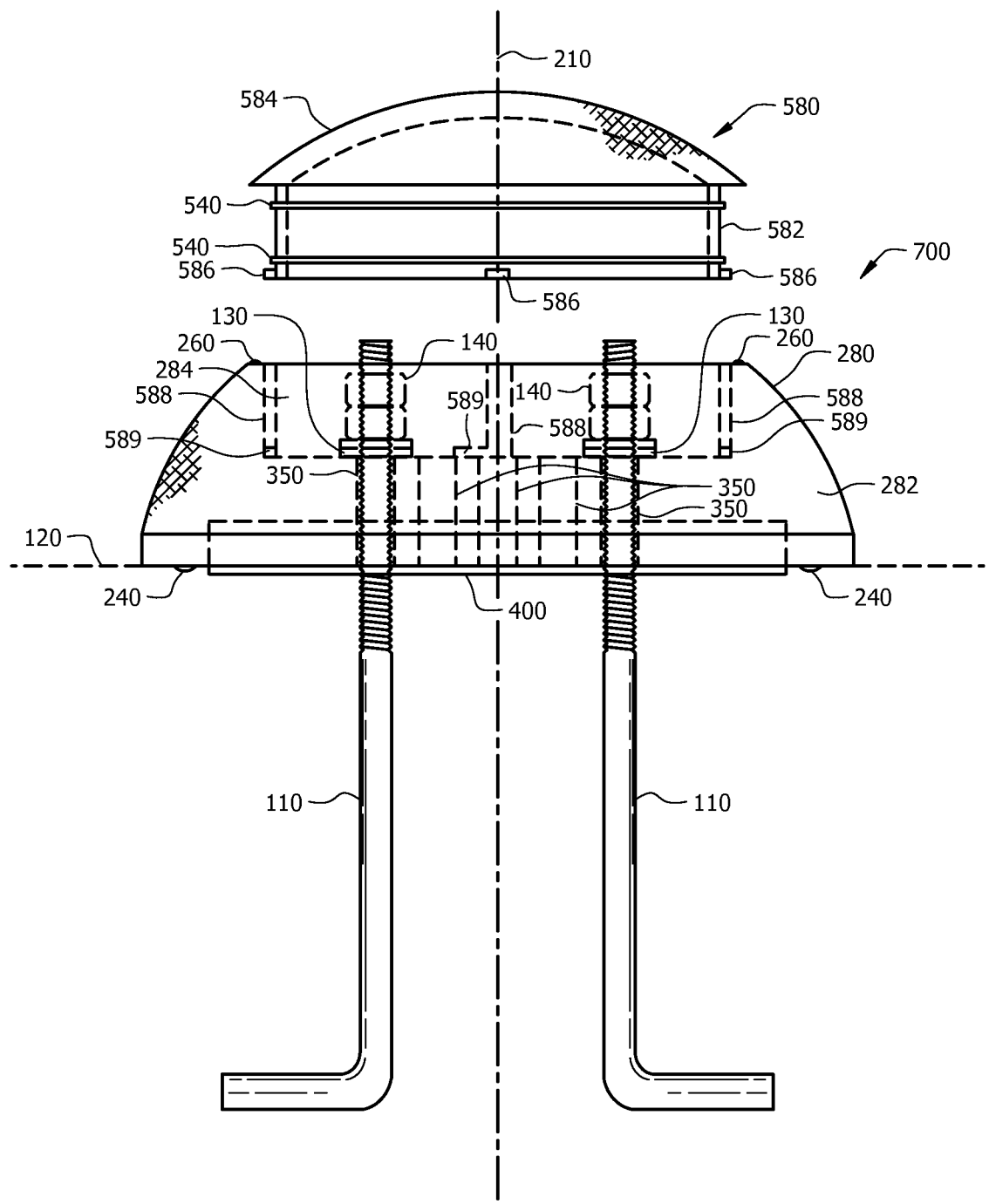
FIG. 7A depicts a side view of a projected bolt impact protection device 700 according to an embodiment of the present disclosure.
Figure 7B:
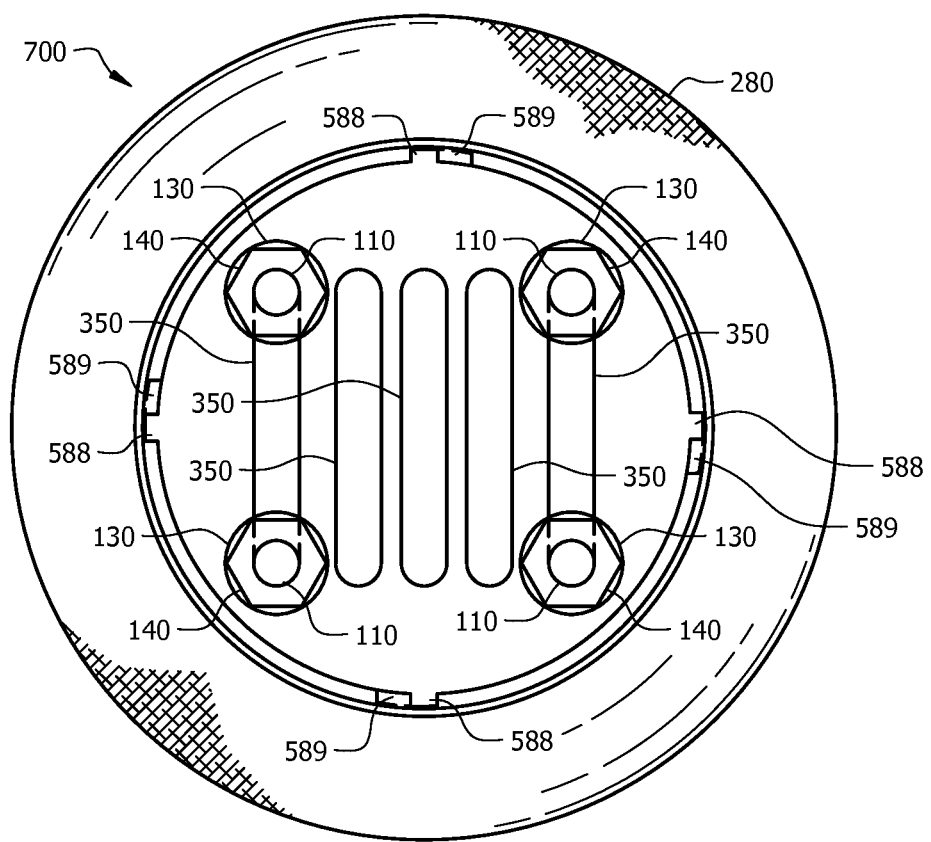
FIG. 7B depicts a top view of a projected bolt impact protection device 700 according to an embodiment of the present disclosure.

Referring now to FIGS. 7A and 7B, yet another projected bolt impact protection device 700 is depicted. Device 700 may generally comprise a cap 280 and multiple vertical shafts 350. Cap 280 may comprise a lower section 282 and an upper section 284. In an embodiment, lower section 282 may comprise multiple vertical shafts 350. In various embodiments, vertical shafts 350 may comprise any suitable shape including, but not limited to, round, polygonal, slotted (straight or curved), or any combination thereof, and may be arranged in any suitable pattern. In some embodiments, shafts 350 may be arranged in a pattern known to fit a grouping of multiple bolts 110. The pattern and shapes of shafts 350 may provide for the use of one cap for varied bolt patterns. Upper section 284 of cap 280 may comprise any suitable shape and dimensions. In various embodiments, upper section 284 may be round or polygonal in shape, and may be centered on center axis 210 of cap 280. In an embodiment, device 700 further comprises a plug 580. Plug 580 may comprise a lower section 582 of similar size and shape as cap upper section 284, and may be hollow so as to not interfere with exposed portions of bolts 110, washers 130, and fasteners 140 disposed therein. Plug 580 may comprise an upper section 584, and in various embodiments, upper section 584 may be dome-, cone-, pyramidal-, or n-sided polyhedron-shaped. In an embodiment, plug lower section 582 may comprise one or more a gasket rings 540 around its exterior that may seal the joint between plug 580 and cap upper section 284. In one embodiment, the friction between the plug gasket ring(s) 540 and cap upper shaft 284 may hold plug 580 in place. In another embodiment, plug 580 may couple with cap 280 through a tab-and-slot interface as previously described. Tabs 586 on plug 580 may be configured to be inserted into slots 588 in cap upper section 284, and may lock in place in narrow sections 589 when rotated, or vice versa. Additional gasket rings 540 may be affixed near the top of the cap 280 and/or the bottom lip of plug 580.

Figure 8A:
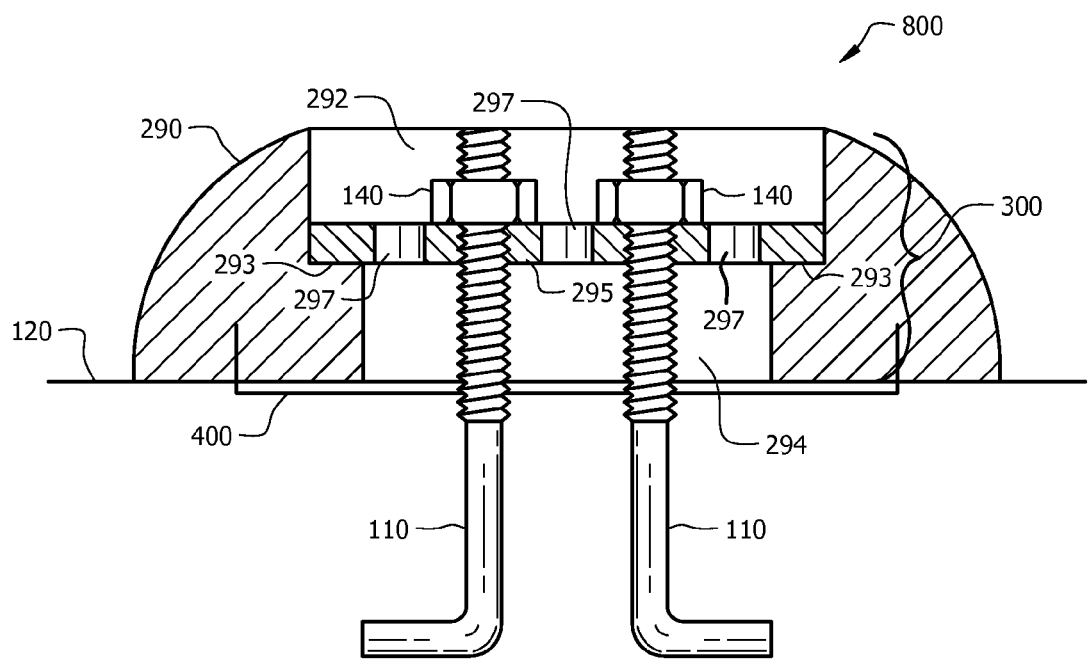
FIG. 8A depicts a side cutaway view of a projected bolt impact protection device 800 according to an embodiment of the present disclosure.
Figure 8B:
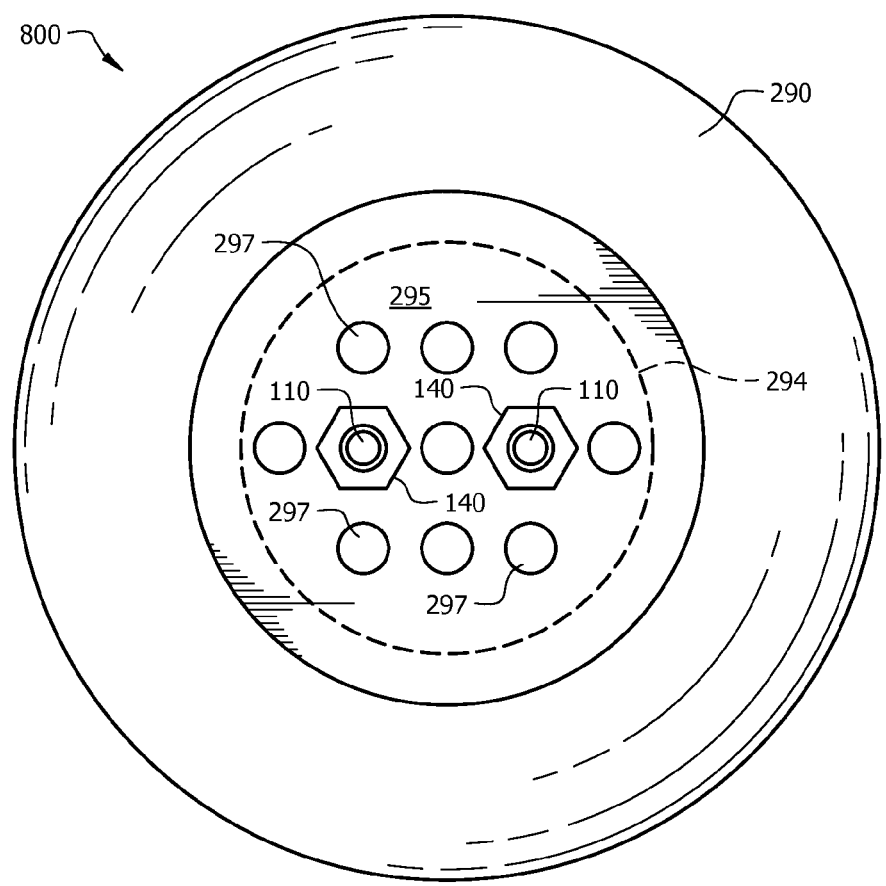
FIG. 8B depicts a top view of a projected bolt impact protection device 800 according to an embodiment of the present disclosure.

Referring now to FIGS. 8A and 8B, yet another projected bolt impact protection device 800 is depicted. Device 800 may generally comprise a cap 290, a disk 295, and means for supporting disk 295 horizontally therein. Cap 290 may be similar in construction to previously described embodiments, and may comprise a shaft 300 extending vertically there through. In various embodiments, vertical shaft 300 may comprise any shape including, but not limited to, round, polygonal, or slotted (straight or curved), suitable to accommodate portions of projected bolts 110 therein. Cap 290 may similarly comprise one or more cleat 400, gaskets 230, 260, and/or gripping surface 212. Disk 295 may comprise any suitable structure configured to fit horizontally within at least a portion of shaft 300. Disk may be of any suitable shape including, but not limited to circular, square, or polygonal, and may be of a radial size and axial depth suitable to fit within a portion of shaft 300. In an embodiment, shaft 300 and disk 295 are circular, and disk 295 has a diameter slightly smaller than the diameter of shaft 300. In various embodiments, disk 295 may comprise one or more ports extending axially there through. Ports 297 may be of any suitable shape and size to accommodate a portion of bolts 110 therein. In an embodiment, ports 297 are circular. In various embodiments, ports 297 may be arranged in a pattern suitable to accommodate a plurality of bolt patterns. In an embodiment, ports 297 may be arranged in several rows comprising several ports 297 each. In another embodiment, ports 297 may be arranged in a circular or polygonal pattern radiating outwards from a central axis. In yet another embodiment, ports 297 may comprise slots (straight or curved) as previously described. Device 800 may comprise support means 293 for supporting disk 295 horizontally within shaft 300. In an embodiment, support means 293 may comprise a ledge formed at the juncture of an upper section 292 of the shaft and a lower section 294 of the shaft, the upper section 292 having a larger radial dimension than the lower section 294. In another embodiment, ledge may be formed at the juncture of upper section 292 and lower section 294 as a result of each section 292, 294 having a different shape and/or orientation. In yet another embodiment, support means 293 may comprise one or more support members protruding into shaft 300. Support members may comprise any suitable mechanism protruding into shaft 300 that may support disk 295 horizontally therein. In various embodiments, one or more cross-members may span a portion of shaft 300, thereby providing a support surface. Cross-members may be configured to minimize blockage of shaft 300 and/or ports 297. In an embodiment, an x-shaped cross-member may horizontally span shaft 300. In various embodiments, support member may comprise one or more protuberances protruding slightly into shaft 300. In an embodiment, four protuberances jut into shaft 300 forming support means for disk 295 around the edges. In another embodiment, support mechanism may comprise a substantially hollow ring projects into shaft 300. Ring may be of any suitable shape (not just circular). It should be recognized that the previous examples are merely descriptive embodiments of a multitude of possible support means 293, and the present disclosure accordingly should not be limited as such. Device 800 may similarly comprise one or more plugs 500, 550, 580 as previously described.

In operation, projected bolt impact protection device 100 may be deployed as follows. One or more washers 130 may be placed over projected bolt 110 such that they are resting on base surface 120. Fasteners 140 may be placed within upper section 330 of shaft 300. Cap 200 and shaft 300 may positioned over bolt 110 such that bottom 220 of cap 200 faces base surface 120, and subsequently lowered such that bolt 110 is inserted into bottom section 310 of shaft 300. For embodiments having an internally threaded middle section 320, cap 200 may then be rotated about projected bolt 110 such that the threads engage external threads on bolt 110. For embodiments in which upper section 330 is configured to prevent rotation of fasteners 140 therein, fasteners 140 will also rotate with shaft 300, thereby securing them to bolt 110 as well. Cap 200 may continue to be turned such that it moves down bolt 110 until it sits firmly on base surface 120. For embodiments in which upper section 330 is configured to receive a socket wrench (or other tool), fasteners 140 may be tightened onto bolt 110 using the tool. Further rotation of shaft 300 (via cap 200) and/or tightening of fasteners 140 (via tool) may cause cleat 400 and gasket ring 240 to engage base surface 120. Plug 500 may then be affixed to cap 200 by pushing the bottom section 510 into upper section 330 of shaft 300, or additionally/alternatively, may be secured to bolt 110 itself as previously described.

In operation, projected bolt impact protection device 600 may be deployed as follows. One or more washers 130 may be placed over each projected bolt 110 such that they are resting on base surface 120. Fasteners 140 may be placed within upper sections 330 of shafts 300. Cap 250 and shafts 300 may positioned over bolts 110 such that bottom 220 of cap 250 faces base surface 120, and subsequently lowered such that bolts 110 are inserted into lower sections 310 of shaft 300. Device 600 may be pushed down further until it sits firmly on base surface 120. For embodiments in which upper sections 330 are configured to receive a socket wrench (or other tool), fasteners 140 may be tightened onto bolts 110 using the tool. Tightening of fasteners 140 may cause cleat 400 and gasket ring 240 to engage base surface 120. Plugs 500, if so equipped, may then be affixed to cap 250 by pushing the bottom section 510 into upper section 330 of shaft 300, or additionally/alternatively, may be secured to bolts 110 themselves as previously described. Plug 550, if so equipped, may be similarly affixed (depending on the coupling mechanism of the particular embodiment). If equipped with the tab-slot embodiment previously described, plug 550 may be positioned such that tab(s) 560 insert into slot(s) 570, and locked in place into narrow section 572 of slot(s) 570.

In operation, projected bolt impact protection device 700 may be deployed as follows. Cap 280 and shafts 350 may positioned over bolts 110 such that the bottom of cap 280 faces base surface 120, and subsequently lowered such that bolts 110 are inserted into shafts 350. Device 700 may be pushed down further until it sits firmly on base surface 120. One or more washers 130 may be placed over each projected bolt 110 such that they are resting on bottom of cap upper section 284. Fasteners 140 may be placed on and tightened down by hand or with any suitable tool on bolt 110 until they fit securely against washer(s) 130 in cap upper section 284. Tightening of fasteners 140 may cause cleat 400 and gasket ring 240 to engage base surface 120. Plug 580 may then be affixed to cap 280 by pushing the plug lower section 582 into cap upper section 284. If equipped with the tab-slot embodiment previously described, plug 580 may be positioned such that tab(s) 586 insert into slot(s) 588, and locked in place into narrow section 589 of slot(s) 588.

In operation, projected bolt impact protection device 800 may be deployed as follows. Cap 290 may positioned over bolts 110 such that the bottom of cap 290 faces base surface 120, and subsequently lowered such that bolts 110 are inserted into shaft 300. Disk 295 may be positioned over bolts 110 and ports 297 aligned such that bolts 110 may pass there through as disk 295 is lowered. Disk 295 may be lowered until it rests on support means 293. Fasteners 140 may be placed on and tightened down by hand or with any suitable tool on bolts 110 until they fit securely against disk 295. Further tightening of fasteners 140 may cause disk 295 to press down on support means 293, providing for cleat 400 and gasket ring 240 to engage base surface 120.

In various embodiments, caps 200, 250, 280, 290 may comprise multiple pieces that may be coupled together. In an embodiment, caps herein may comprise two or more pieces that may be positioned around bolts 110 and joined there around, rather than being lowered as one piece onto bolts 110. Pieces may be coupled by any suitable coupling mechanism known in the art.

When installed, various embodiments of projected bolt impact protection devices 100, 600, 700, 800 of the present disclosure may decrease the likelihood of damage to a projected bolt 110 in a variety of ways. The shape of devices 100, 600, 700, 800 may provide for tires and treads to roll over projected bolt 110 or grouping of bolts 110 rather than bending or otherwise deforming projected bolt(s) 110. Devices 100, 600, 700, 800 may distribute horizontal force to the entire length of bolt 110, thereby lowering the moment arm length that is working to bend or otherwise deform projected bolt 110. Devices 100, 600, 700, 800 may resist horizontal forces and impacts by resolving the resultant overturning moment into a compression force (one side of the device bearing on base surface 120) and a tension force (resisted axially by the bolt(s) 110. Cleats 400 may grips base surface 120, thereby acting as a shear lug so that the device, instead of the bolt(s) 110, may transmit horizontal shear forces to base surface 120.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A projected bolt impact protection device configured to protect one or more bolts projecting from a base surface, the projected bolt impact protection device comprising:
    a substantially dome-shaped cap having a substantially hollow shaft extending vertically there through, the shaft configured to accommodate the one or more bolts projecting from the base surface;
    a structure configured to fit within the shaft, the structure comprising one or more vertical orts; and
    horizontal support means for supporting the structure within the shaft at an axial depth configured to provide for a portion of the one or more bolts to extend through and protrude from the one or more of the vertical ports, the support means comprising a ledge formed at the juncture of an upper section of the shaft and a lower section of the shaft, the upper section having a larger radial dimension and a different shape than the lower section.

2. The projected bolt impact protection device according to claim 1, wherein at least a portion of the cap further comprises a gripping surface.

3. The projected bolt impact protection device according to claim 1, wherein the shaft is in substantial coaxial alignment with a central vertical axis of the cap.

4. The projected bolt impact protection device according to claim 1, wherein the lower section of the shaft is connected to and in substantial axial alignment with the upper section of the shaft.

5. The projected bolt impact protection device according to claim 1, wherein the upper section is configured to accept a fastener tool for tightening the fastener to a portion of the one or more bolts therein.

6. The projected bolt impact protection device according to claim 1, the shaft having a third section configured to house one or more washers.

7. The projected bolt impact protection device according to claim 1 further comprising:
    a cleat for gripping the base surface.

8. The projected bolt impact protection device according to claim 1 further comprising:
    a gasket for creating a seal between the cap and the base surface.

9. The projected bolt impact protection device according to claim 1 further comprising:
    a plug.

10. The projected bolt impact protection device according to claim 9, wherein a portion of the plug is configured to couple with a section of the shaft.

11. The projected bolt impact protection device according to claim 9, wherein the plug has a rounded top.

12. The projected bolt impact protection device according to claim 9, wherein the plug is configured to couple with the cap.

13. The projected bolt impact protection device according to claim 12 further comprising:
    a gasket for creating a seal between the plug and the cap.

14. The projected bolt impact protection device according to claim 1, wherein an inner surface of the upper section has a similar size and shape as a bolt fastener.

15. The projected bolt impact protection device according to claim 1, wherein dimensions of the upper section are configured to prevent a bolt fastener from rotating therein.

16. The projected bolt impact protection device according to claim 1, wherein the upper section has a hexagonal inner cross section.

17. The projected bolt impact protection device according to claim 1, wherein the upper section has a square inner cross section.

18. A projected bolt impact protection device configured to protect one or more bolts projecting from a base surface, the projected bolt impact protection device comprising:
    a substantially dome-shaped cap having a substantially hollow shaft extending vertically there through, the shaft configured to accommodate the one or more bolts projecting from the base surface;
    a structure configured to fit within the shaft, the structure comprising one or more vertical ports; and
    horizontal support means for supporting the structure within the shaft at an axial depth configured to provide for a portion of the one or more bolts to extend through and protrude from the one or more of the vertical ports, the support means comprising a ledge formed at the juncture of an upper section of the shaft and a lower section of the shaft, the upper section having a larger radial dimension than the lower section, wherein the structure is a nut.

19. The projected bolt impact protection device according to claim 18, wherein the upper section and the lower section of the shaft each have a circular cross section.

20. A projected bolt impact protection device configured to protect one or more bolts projecting from a base surface, the projected bolt impact protection device comprising:
    a substantially dome-shaped cap having a substantially hollow shaft extending vertically there through, the shaft configured to accommodate the one or more bolts projecting from the base surface;
    a structure configured to fit within the shaft, the structure comprising one or more vertical ports; and
    horizontal support means for supporting the structure within the shaft at an axial depth configured to provide for a portion of the one or more bolts to extend through and protrude from the one or more of the vertical ports, the support means comprising a ledge formed at the juncture of an upper section of the shaft and a lower section of the shaft, the upper section having a larger radial dimension than the lower section, wherein the structure is a nut and washer combination.

* * * * *